United States Patent [19]

Giles et al.

[11] Patent Number: 5,241,414
[45] Date of Patent: Aug. 31, 1993

[54] FAULT TOLERANT OPTICAL AMPLIFIER ARRANGEMENT

[75] Inventors: Clinton R. Giles, Middletown; Tingye Li, Rumson, both of N.J.

[73] Assignee: AT&T Bell Laboratories, Murray Hill, N.J.

[21] Appl. No.: 934,150

[22] Filed: Aug. 21, 1992

[51] Int. Cl.[5] .............................. G02B 6/26; H01S 3/30
[52] U.S. Cl. ................................. 359/341; 359/345; 372/70
[58] Field of Search .............. 359/341, 345, 160, 176, 359/636; 606/11, 12; 372/70

[56] References Cited

U.S. PATENT DOCUMENTS

| | | | |
|---|---|---|---|
| 4,383,318 | 5/1983 | Barry et al. .......................... | 372/70 |
| 4,867,518 | 9/1989 | Stanwitz et al. ..................... | 359/345 |
| 5,020,152 | 5/1991 | Glista .................................. | 359/160 |
| 5,054,876 | 10/1991 | Grasso et al. ....................... | 385/24 |
| 5,083,874 | 1/1992 | Aida et al. ........................... | 385/24 |

Primary Examiner—Nelson Moskowitz
Attorney, Agent, or Firm—Gregory C. Ranieri

[57] ABSTRACT

For a group of optical amplifiers, pump beams from an array of lasers are mixed together to form a plurality of composite pump beams. Each composite pump beam is distributed to the pump port of a particular optical amplifier. The composite pump beam improves the reliability of each optical amplifier. Rather than having catastrophic failure of an optical amplifier occasioned by the failure of its pump laser, it is now possible to maintain full operation of the group of optical amplifiers even though one or more lasers fail.

15 Claims, 2 Drawing Sheets

FAULT TOLERANT OPTICAL AMPLIFIER ARRANGEMENT

TECHNICAL FIELD

This invention relates to lightwave systems and, more particularly, to optical amplifiers and laser apparatus for pumping optical amplifiers in such systems.

BACKGROUND OF THE INVENTION

Reliability of lightwave communication systems using optical amplifiers along the transmission path from transmitter to receiver depends heavily on the reliability of such optical amplifiers. Optical amplifiers find extensive use in lightwave communication systems for boosting lightwave signal power sufficiently high to enable transmission over relatively long distances. Optical amplifiers are attractive alternatives to other amplifier forms because they amplify lightwave signals in their photonic form without conversion into a corresponding electrical signal. Each such optical amplifier is pumped, either optically or electrically, to provide signal amplification. While fiber structures and semiconductor structures have been used to realize these amplifiers, optically pumped, doped fiber amplifiers appear to be most widely accepted for use in fiber lightwave systems for a number of reasons. An optical fiber realization causes the amplifier to be readily matchable to, and integrable with, the fiber transmission media. In addition, the fiber-based optical amplifier provides polarization-independent gain, a broad and well-defined gain spectrum, and resistance to intersymbol interference for multi-channel wavelength-division-multiplexed systems.

At its inception, the fiber-based optical amplifier such as the rare-earth doped optical fiber amplifier had been optically pumped by a single light source. Light from the single source, such as a laser operating at the appropriate pump wavelength, is coupled into the doped fiber to create an appropriate amplifying medium via inversion of the rare-earth ions. Hence, this type of optical amplifier is only as reliable as its pump laser. When the pump laser fails, the entire optical amplifier fails. Dual port pumping, that is, pumping from the input and output ports of the optical amplifier mitigates this problem to some degree when separate lasers pump the different ports. But, when either pump laser in the dual port scheme fails, the pump power through that port of the amplifier is undeniably lost.

An aging pump laser may provide insufficient optical power to produce the required amount of amplification for the doped optical fiber amplifier. If the laser malfunctions, amplification may be interrupted until the pump laser is replaced or repaired. When the pump laser fails, the amplifier fails.

There is no known technique or apparatus for removing this interdependence between the operational reliability of the amplifier and the operational reliability of its pump laser. No techniques or apparatus are known to have been proposed for providing uninterrupted amplification from an optically pumped optical amplifier regardless of the operational status of its pump laser. Moreover, there has been no technique or apparatus proposed for insuring that pump power continues to be delivered to one or more pump ports of the amplifier in spite of pump laser failures.

SUMMARY OF THE INVENTION

Reliable optical amplifier operation is guaranteed in spite of pump light source aging or failure by utilizing a fault tolerant architecture. In this architecture, an array of pump light sources operating at a nominal pump wavelength have their output beams combined and then distributed to produce an array of output pump beams. Each output pump beam is a composite of the output beams of the pump light sources. In other words, each output pump beam includes a predetermined fraction of every output beam from the light source array. This insures that failure of one or more of the pump light sources does not interrupt the supply of optical pump power to pump ports of the amplifier.

In one embodiment, each active pump light source is coupled to the input port of a multiple input, multiple output star coupler. The pump beam at each output port of the star coupler comprises a portion of each beam input to the star coupler. Each output port of the coupler is then coupled optically to the input pump port of a doped fiber optical amplifier.

In these fault tolerant architectures, sparing techniques are employed to increase the overall reliability of the amplifier arrangement.

BRIEF DESCRIPTION OF THE DRAWING

A more complete understanding of the invention may be obtained by reading the following description of specific illustrative embodiments of the invention in conjunction with the appended drawing in which.

DETAILED DESCRIPTION

In the present fault tolerant optical amplifier architecture, reliability is improved and catastrophic optical amplifier failure is avoided by combining the beams from M pump lasers into N composite output pump beams which provide pumping for N optical amplifiers. Contrary to prior art teachings, no single pump laser provides the sole pumping for a pump port of the optical amplifier. Instead, a fraction of each pump laser beam contributes to the formation of the composite output pump beam supplied to the optical amplifier. The input pump beams from the lasers are combined to form N composite pump beams, each of which includes a fraction (e.g., 1/N) of each input pump beam. This permits uninterrupted operation of the N optical amplifiers when one or more pump lasers has failed because the failure of n pump lasers reduces the available pump power only by a factor of n/N. In the prior art, failure of the pump laser almost certainly interrupted operation of the associated optical amplifier.

Figure 1:
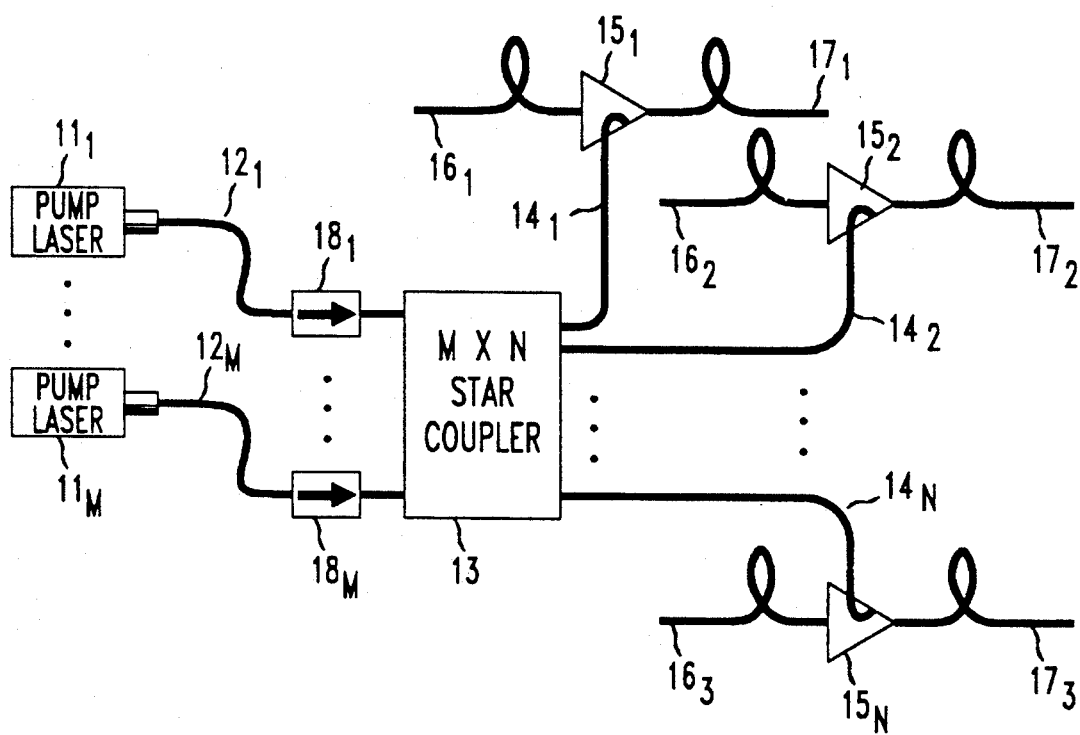
FIG. 1 shows a simplified block diagram of an optical amplifier arrangement having the inventive fault tolerant architecture.

An exemplary fault tolerant optical amplifier architecture called a "star-pumped optical amplifier array" is shown in FIG. 1. An array of M pump lasers 11 are coupled optically to M×N star coupler 13 via input optical waveguides 12. Star coupler 13 has M input ports and N output ports. Output optical waveguides 14 carry the outputs from star coupler 13 to N optical amplifiers 15. Each optical amplifier 15 is depicted in its transmission system environment wherein input transmission fiber 16 carries transmitted signals to the amplifier for amplification and output transmission fiber 17 carries the amplified, transmitted signals away from the amplifier.

Isolator 18 is shown in the transmission path between pump laser 11 and star coupler 13. The isolator is a standard in-line, unidirectional transmission element which reduces reflections back toward the laser. Although isolator 18 is included in FIG. 1, it should be understood that isolator 18 is an optional element in the realization of the fault tolerant optical amplifier architecture.

Star coupler 13 is an optical device which accepts optical input signals at its input ports and combines them in such a way that substantially the same composite optical signal appears at the output ports of the coupler. For the coupler shown in FIG. 1, M pump beams are combined in the coupler and then distributed proportionately to each of the N output ports so that the composite pump beam at any of the output ports is made up of $1/N^{th}$ of the optical power of the M combined pump beams. That is, the composite pump beam includes $1/N^{th}$ of the power of the pump beam from laser $11_1$, $1/N^{th}$ of the the power of the pump beam from laser $11_2$, and so on through 1/Nth of the power of the pump beam from laser $11_M$. Optical multiplexers and demultiplexers, optical signal combiners and distributors, and optical switches are capable of providing the combining function of star coupler 13. One embodiment of a passive star coupler is taught in U.S. Pat. No. 4,904,042 issued to C. Dragone and is expressly incorporated herein by reference.

For star coupler 13, the number of input ports M and the number of output ports N are integer numbers greater than or equal to 2. The number of input ports can be greater than, less than, or equal to, the number of output ports.

Fault tolerance is achieved by having the necessary protection built into the pump beam supplied to an amplifier pump port. In this architecture, the protection comes from having a portion of the optical power from each beam combined into the pump beam supplied to the amplifier pump port. In one exemplary architecture, such as when there are more output ports than input ports, all of which are fully connected, the amplifier arrangement exhibits fault tolerance provided that the optical power delivered to each amplifier is sufficient to achieve the desired amplifier gain. Such a structure may be desirable, for example, when the average output power of each pump laser exceeds the power requirement for each individual pump port of an amplifier. In a different exemplary embodiment, fault tolerance is achievable when the number of input ports (pump lasers) exceeds the number of output ports (optical amplifier pump ports). In the latter structure, it may be desirable to utilize lower average output power lasers. It may also be desirable to utilize high average output power lasers which are operated at a lower output power to extend the lifetime of the pump lasers. This type of operation builds redundancy into the amplifier architecture and, thereby, improves reliability of the optical amplifier apparatus.

Pump laser 11 generates an optical pump beam at a suitable wavelength for producing amplification in optical amplifier 15. For erbiumdoped optical amplifiers, pump wavelengths in the neighborhood of 800 nm., 980 nm., and 1480 nm. are suitable. Hence, semiconductor lasers such as AlGaAs and InGaAsP devices can be employed as pump lasers 11. While the description has focussed on lasers as pump sources, it is contemplated that other types of light sources may be suitable for pumping the optical amplifiers.

Optical amplifier 15 comprises generally a section of rare-earth doped optical fiber and a combining element for introducing the pump beam into the transmission path with the transmitted signal. The combining element is generally a wavelength selective element which exhibits selectivity around the pump wavelength. The doped optical fiber, when pumped by light beams at the proper wavelength, produces gain for transmitted signals within the amplification bandwidth of the amplifier. The pump wavelength and the amplification bandwidth are determined, among other things, by the fiber dopant materials. Exemplary doped optical fiber amplifiers are disclosed in U.S. Pat. Nos. 4,780,877 (Snitzer), 5,005,175 (Desurvire), and 5,027,079 (Desurvire) which are expressly incorporated herein by reference.

Reliability of the star-pumped amplifier arrays can also be improved further by utilizing various redundancy techniques. One technique, as mentioned above, is a hot spare technique which involves the use of a sufficient number of lasers having a combined output power which exceeds the total pump power required by the amplifiers being served. In this case, each laser could be operated at a lower average output power so that the total output power available at the combining element output ports meets the amplifier pumping requirements. As lasers age or fail, the drive current to the pump lasers can be controllably increased so that the total output power available at the combining element output ports continues to meet the amplifier pumping requirements. By initially operating the pump lasers at lower output powers and with lower drive currents, it is possible to improve the overall reliability of the amplifiers because the laser lifetimes are lengthened.

Figure 2:
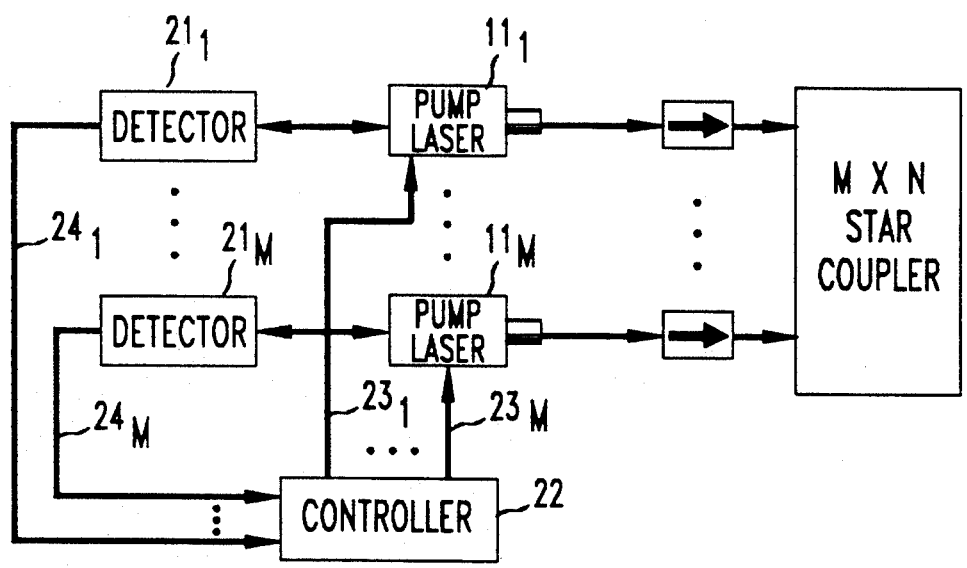
FIG. 2 shows an alternative embodiment of the arrangement in FIG. 1 having a pump laser sparing capability.

In order to realize the hot spare arrangement in the inventive architecture, it is necessary to monitor, in some fashion, at least a portion of the output power of each of the pump lasers. One exemplary embodiment is shown in FIG. 2. A backface monitor 21, a photodetector, on each pump laser 11 monitors the optical power emitted through the rear end or facet of the laser. The amount of power radiated through the rear facet is generally less than 10% of the total power. Controller 22 receives the monitored signals on leads 24. The total backface output power is computed by summing the individual monitored signals together in controller 22. When the total backface output power level falls below a predetermined power level, it is generally indicative of a failure by one or more pump lasers. The failure may be catastrophic or gradual. By comparing the total backface output power to a desired output power level, the controller 22 can increase or decrease, if necessary, the pump laser drive currents on leads 23. The desired output power level may be proportional to the total required pump power for the amplifiers.

Although not depicted in the Figures, it is contemplated that monitoring may be done at other locations in the system such as at a remote end of the transmission system or even at an output port of the star coupler.

Other sparing techniques include the use of one or more cold spare pump lasers. In such an arrangement, one or more of the input ports for the coupler would be connected to inactive pump lasers. When the controller, such as in FIG. 2, senses a reduced backface output power level from the active pump lasers, it activates the one or more previously inactive pump lasers to increase the total available output power to be at the desired level.

In the context above, the term "cold spare" refers to the laser being activated from a substantially off state, whereas hot spare refers to the laser being connected through to the coupler while in a pre-existing on state.

One important benefit derived from the fault-tolerant amplifier architecture is that maintenance and repair of faulty pump lasers can be accomplished without disrupting amplifier service and, more importantly, without interrupting the supply of pump power to each and every amplifier pump port. When a pump laser is replaced in the new architecture, pump power may be reduced at each output port of the star coupler and therefore to each amplifier pump port. But no amplifier pump port is denied pump power in the process.

The present invention is also applicable to Raman amplification systems wherein an optical transmission fiber is pumped at various locations to provide gain via Raman processes. Such systems have been disclosed in U.S. Pat. Nos. 4,699,452 and 4,881,790 and are the descriptions are expressly incorporated herein by reference. These patents show the use of a plurality of light sources at different wavelengths being coupled together optically to feed a single fiber for Raman amplification. It is also contemplated that this inventive architecture is applicable to optical semiconductor amplifiers which are optically pumped.

What is claimed is:

1. Optical amplification apparatus comprising:
   a plurality of doped fiber optical amplifiers, each responsive to a first optical pump beam;
   a plurality of pump light sources, each for generating a second optical pump beam substantially at a pump wavelength; and
   means optically connecting the plurality of light sources to the plurality of optical amplifiers for distributing a predetermined portion of the power of each second optical pump beam to each optical amplifier so that each first optical pump beam is substantially at the pump wavelength and includes the predetermined portion of each second optical pump beam from the plurality of light sources.

2. The optical amplification apparatus as defined in claim 1 wherein there are N pump light sources and M optical amplifiers, and M and N are positive integers greater than or equal to 2.

3. The optical amplification apparatus as defined in claim 1 further including means for controlling the power of the optical pump beams generated by the pump light sources in response to a representation of the optical power delivered to the optical amplifiers.

4. The optical amplification apparatus as defined in claim 1 further including a spare pump light source connected optically to the combining means for generating an individual pump beam and means for controlling the spare pump light source to supply its pump beam to the combining means at the occurrence of a predetermined criterion..

5. The optical amplification apparatus as defined in claim 4 wherein the predetermined criterion is failure of at least one pump light source in the plurality of pump light sources.

6. The optical amplification appatus as defined in claim 4 wherein there are N pump light sources and M optical amplifiers, and M and N are positive integers greater than or equal to 2.

7. The optical amplification apparatus as defined in claim 1 wherein the combining means includes an optical star coupler having sufficient input and output ports to optically couple the pluralities of light sources and optical amplifiers, respectively.

8. Optical amplification apparatus comprising:
   a plurality of light sources, each for generating an input light beam substantially at a pump wavelength;
   a plurality of input waveguides, each coupled to receive one of the input light beams;
   a plurality of output waveguides;
   a combining region disposed between the plurality of input waveguides and the plurality of output waveguides for mixing the plurality of input light beams so that a plurality of output light beams is formed substantially at the pump wavelength and coupled into the plurality of output waveguides; and
   a plurality of doped fiber optical amplifiers, each having an input port for receiving the light beam from a different one of the plurality of output waveguides.

9. The optical amplification apparatus as defined in claim 8 wherein there are N light sources and M doped fiber optical amplifiers, and M and N are positive integers greater than or equal to 2.

10. The optical amplification apparatus as defined in claim 8 further including a spare light source connected optically to the combining region via an input waveguide for generating an individual input light beam and means for controlling the spare light source to supply its input light beam to the combining region at the occurrence of a predetermined criterion.

11. The optical amplification apparatus as defined in claim 10 wherein the predetermined criterion is failure of at least one light source in the plurality of light sources.

12. The optical amplification apparatus as defined in claim 11 wherein there are N light sources and M doped fiber optical amplifiers, and M and N are positive integers greater than or equal to 2.

13. The optical amplification apparatus as defined in claim 8 wherein the combining region includes an optical star coupler having sufficient input and output ports to optically couple the input and output waveguides, respectively.

14. Optical amplification apparatus comprising:
   a plurality of pumped doped fiber optical amplifiers,
   a plurality of pump light sources each for generating a pump light beam, and
   means for optically connecting the plurality of pump light sources to the plurality of pumped optical amplifiers in such a way that a portion of the power of each pump beam is distributed to each pumped optical amplifier.

15. The optical amplification apparatus as defined in claim 14 wherein said connecting means includes a star coupler element having a plurality of input ports and a plurality of output ports, wherein the input ports are connected to the pump light sources and the output ports are connected to pump ports of the optical amplifiers.

* * * * *